United States Patent Office 2,714,893
Patented Aug. 9, 1955

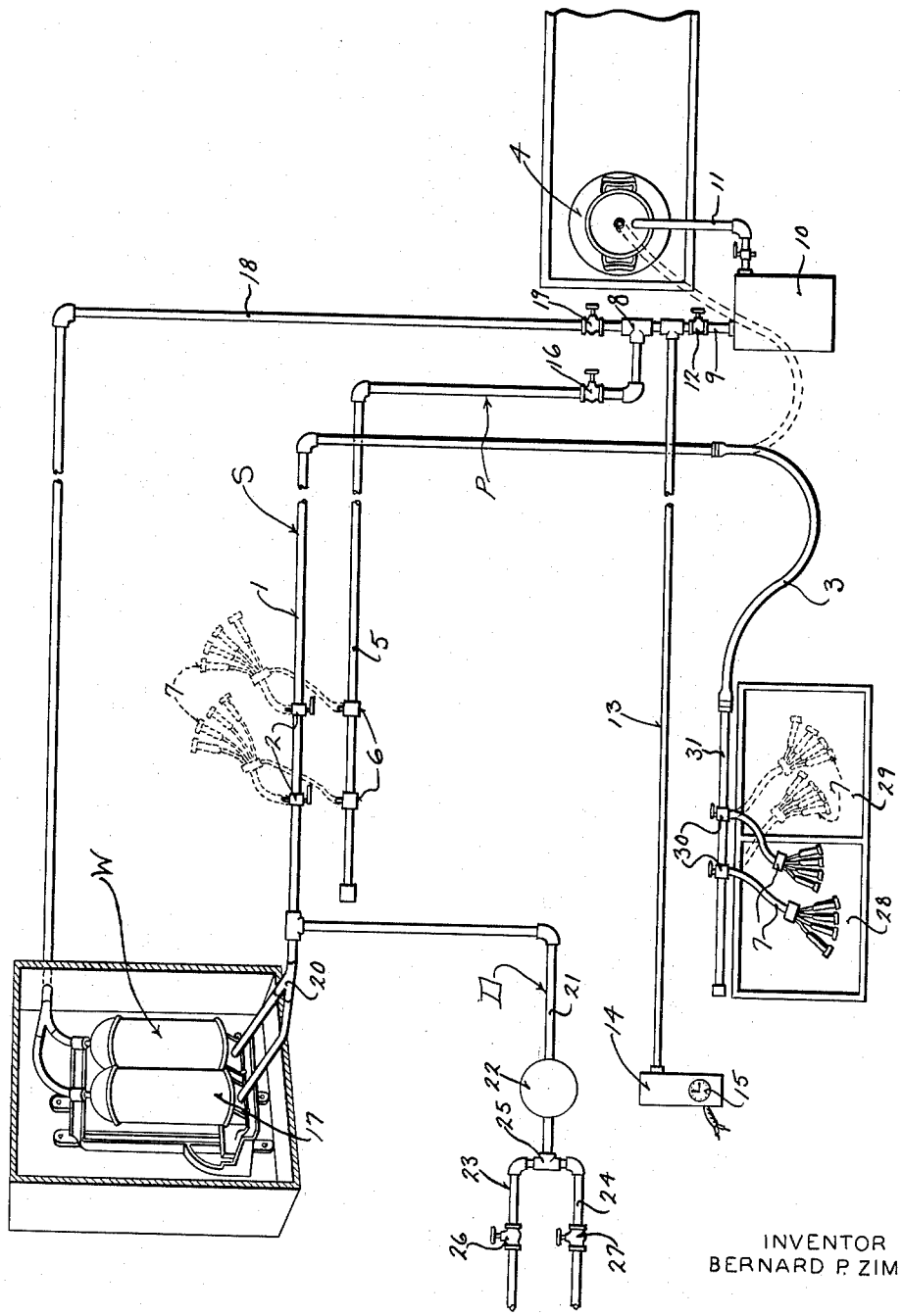

2,714,893

DIRECT WASHING, FLUSHING, AND STERILIZING SYSTEM OF STAINLESS STEEL MILK MACHINE PIPE LINES ON FARMS

Bernard P. Zimmer, Oconomowoc, Wis.

Application December 21, 1953, Serial No. 399,299

2 Claims. (Cl. 134—93)

This invention appertains to pipe line and like milking systems, and more particularly to a novel means for cleaning and for maintaining all parts of the system in a sanitary condition.

With the advent of pipe line milking systems of various characters, much difficulty has been experienced in keeping the pipes, usually stainless steel, and other parts of the system clean, and in a sanitary condition. It has been proposed to utilize in the system, an automatic washer, but such washer only functions to recirculate the same wash water back and forth in the system.

It is, therefore, one of the primary objects of my invention to provide novel means for use in conjunction with such automatic washers for effectively pre-flushing the pipes and system with clean water under pressure before the automatic washer does its work and for finally rinsing and flushing the entire system with clean water to remove all traces of the cleaning solution after the automatic washer has done its work.

Another salient object of my invention is the provision of means for pre-flushing the pipes and parts of a pipe line milking system, then filling the tank with hot water and a detergent from a well or cup in the water line; using the water with the detergent in the tank for the automatic washer, and then finally flushing the pipes and parts with clean water from the water line.

A further important object of my invention is the provision of means whereby the teat cup assemblies and the milk cans or milk storage tank, as the case may be, can be efficiently washed, cleaned and sterilized.

A still further object of my invention is to provide an improved means for direct flushing of a pipe line milking system from a direct water source which can be readily coupled with a pipe line milking system and automatic washer at a small cost.

With these and other objects in view, the invention consists in the novel construction, arrangement and formation of parts as will be hereinafter more specifically described and claimed and illustrated in the accompanying drawing, in which drawing, The figure is a schematic view showing the principles of my invention incorporated with one type of pipe line milking system and automatic washer.

Referring to the drawing in detail, the letter S generally indicates a pipe line milking system having connected therewith an automatic washer W and my direct flushing device D.

The pipe line milking system S can be considered as of a type now in general use, with the same being a single pipe line as shown, circle pipe line, double or U-pipe line, etc. As illustrated, the system S includes the milk line 1 having a cock 2 for each stall in a barn. Communicating with the outer end of the milk pipe line 1 is a flexible hose 3 which conducts the milk to a milk can 4 or tank type milk cooler, as the case may be. This hose during cleaning can be disconnected from the can or storage tank and coupled with a part of my cleaning apparatus, as will be later set forth. The system also includes the vacuum pipe line 5 having the desired number of connections 6 for teat cup assemblies 7 which are also connected with the stall cocks 2, as can be readily understood. The vacuum pipe line 5 communicates through a T-coupling 8 with a pipe 9 leading to a trap 10 which has connection through a pipe 11 with the milk can or tank. Incorporated in the pipe 9 below the T-coupling 8 is a hand operated valve 12 and connected with the pipe 9 between the coupling 8 and the valve 12 is the pump pipe line 13 leading from a vacuum pump 14. An electric timer switch 15 is operatively connected with the electric motor of the pump for a purpose which will also later appear. The vacuum pipe line 5 has incorporated therein a hand operated shut off valve 16.

The automatic washing machine W is of a type now found in the open market and shown to good advantage in Patent Number 2,213,069 issued August 27, 1940 and the tiltable tanks 17 for wash water are connected at their upper ends by means of a pipe 18 with the T-coupling 8 and a hand operated valve 19 is interposed in the line 18 directly above the coupling 8. The lower ends of the wash tanks 17 are coupled as at 20 with the milk line 1.

My direct flushing device D includes a water conducting line pipe 21 which leads to and is connected with the milk line 1. The pipe 21 has interposed therein a well 22 for a detergent, so that water flowing through the pipe 21 and the well will pick up this detergent. Communicating with the pipe line 21 in advance of the well 22 is a hot water conducting pipe 24, by means of a T-coupling 25. A hand operated valve 26 controls the flow of hot water through the pipe 23 and a hand operated valve 27 controls the flow of cold water through the pipe 24. If the pressure of water flowing through the pipes 23 and 24 is not sufficient for the purpose of direct flushing as will be clearly described, then obviously, a water pump can be employed. In conjunction with my direct flushing device D, I employ a pair of adjacent tanks 28 and 29 and water can be fed into these tanks through control spouts 30 in a pipe 31 and this pipe at certain times is adapted to have connected therewith the flexible hose 3.

In operation of my device D with the washer W and considering that the milking has just been completed, then the teat cup assemblies 7 are removed from the pipe lines 1 and 5 and are coupled with the control valves 30 of cleaning pipe 31, after which the flexible hose 3 is disconnected from the milk can 4 and is attached to the pipe 31. Valves 12 and 16 are closed and valve 27 is opened allowing cold water under pressure to flow into pipe line 21. At this time, no detergent is placed in the well 22 so that only clear rinse water will flow through pipe 21. If desired this cold water can be tempered by hot water from pipe 23 by suitable manipulation of the valve 26. This flushing clean water will flow under pressure through the milk line 1, flexible hose 3, pipe 31 and through the milk assemblies and into tank 28, which is provided with a drain. This direct clean water flushing clears the pipe line 1 of all milk and the cloudy water running through pipe 1 and the milk teat assemblies merely runs down the drain. When the water runs clear, valve 27 is closed, as is valve 26, if the same was partially open. The desired detergent is now placed in well 22 and the hot water valve 26 is opened and the drain for tank 28 is closed. This hot water with the detergent (and disinfectant, if desired) flows through pipe line 1 through assemblies 7 into tank 28, and when the tank is filled the flow of water is stopped by closing valve 26 and the detergent and/or disinfectant is cleaned out of bowl 22. The timer switch 15 is now set for a desired time limit, say ten or fifteen minutes, and a vacuum pump 14 is placed in operation causing actuation of the automatic washer W which constantly circulates and recirculates water back and forth through pipe line 1, flexible hose 3 and assembly 7 from tank 28 to tank 17 of automatic washer W and vice versa. After the automatic stopping of the vacuum pump 14 all water is drained from tank 28 and the milk pipe line 5 and associate parts are again flushed out with clear water from cold water pipe line 24, but suitably tempered if desired. This flushing will carry all wash water with detergent etc. from the milk pipe line 1, hose 3 and teat assemblies and the entire system will be in a clean, sanitary condition.

If desired, the tank 29 can now be filled with a disinfectant and the automatic washer can be set in operation by the timer switch 15 with the assemblies 7 immersed in the disinfectant in tank 29 for circulating such disinfectant back and forth through the pipe line 1.

After the cleaning out of the pipe line 1, and the assemblies, it is preferred to fill in the tank 28 and 29 with clean water and to keep the assemblies 7 immersed therein until the next milking, so that any air-carried spores or bacteria will not be able to gain access to the assemblies 7 or pipe line 1.

Obviously, the milk can 4 or storage tank can be cleaned by merely connecting hose 3 therewith for direct and automatic washing etc.

A milk machine pail can be utilized as a tank in lieu of the automatic cylinder washer W.

From the foregoing, it can be seen that I have provided a simple, but effective means for pre-flushing and final rinsing of the pipe lines and associate parts of a pipe line milking system before and after the automatic washing thereof.

Changes in details may be made without departing from the spirit or the scope of this invention, but what I claim as new is:

1. In a pipe line milking system including a milk conducting pipe line having a plurality of stall cocks, a vacuum line having outlets adjacent to the stall cocks, teat cup assemblies for detachable connection with the stall cocks and outlets, a flexible hose connected with the outlet of the milk line for connection with a milk storage vessel, a vacuum pump connected with the vacuum line, an automatic washer connected with the vacuum line and with the milk line, said vacuum line having connection with the milk storage vessel, a valve for controlling the vacuum to the vessel, a valve for shutting off the vacuum line, and a valve for shutting off the connection of the automatic washer with the vacuum line, a direct water line coupled with the milk line, valve controlled hot and cold water pipes leading to the water line and a detergent receiving well in said water line.

2. In a pipe line milking system as defined in claim 1, a tank, a water conducting pipe adjacent to the tank, said flexible hose being adapted to be connected to said last mentioned pipe, means connecting teat cup assemblies with said last mentioned pipe for immersion in the tank.

References Cited in the file of this patent

UNITED STATES PATENTS

| | | |
|---|---|---|
| 2,622,605 | Brooks | Dec. 23, 1952 |
| 2,680,445 | Hemminger | June 8, 1954 |